United States Patent
Schotten et al.

(10) Patent No.: US 7,450,559 B2
(45) Date of Patent: Nov. 11, 2008

(54) METHOD AND APPARATUS FOR PRESERVING COMPATIBILITY BETWEEN LEGACY MODE(S) OF OPERATION AND NEW MODE(S) OF OPERATION IN A COMMUNICATION SYSTEM

(75) Inventors: Hans Dieter Schotten, Nuremberg (DE); Josef J. Blanz, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 11/250,207

(22) Filed: Oct. 13, 2005

(65) Prior Publication Data

US 2007/0086420 A1    Apr. 19, 2007

(51) Int. Cl.
*H04B 7/212* (2006.01)
*H04Q 7/20* (2006.01)
(52) U.S. Cl. .................. 370/348; 370/329; 455/452.1
(58) Field of Classification Search ............ 370/348, 370/329, 338; 455/451, 452.1, 452.2, 453, 455/454
See application file for complete search history.

(56) References Cited

U.S. PATENT DOCUMENTS

2003/0185241 A1   10/2003  Lu et al.
2005/0141407 A1*   6/2005  Sandhu .................. 370/203
2005/0181800 A1    8/2005  Trachewsky et al.

OTHER PUBLICATIONS

Jianhua Liu et al., "A MIMO System With Backward Compatibility for OFDM Based WLANS", Signal Processing Advances in Wireless Communications, Jun. 2003, pp. 130-134, XP-10713389, SPAWC, Piscataway, NJ, USA.

* cited by examiner

*Primary Examiner*—Lee Nguyen
(74) *Attorney, Agent, or Firm*—Howard H. Seo; Thomas R. Rouse

(57) ABSTRACT

A method and an apparatus for preserving compatibility between legacy mode of operation and new mode of operation in a communication system, wherein allocation of resources is different in the legacy mode of operation and the new mode of operation is disclosed. Accordingly, an entity of a wireless access network, e.g., a base station, transmits signals comprising information about reallocation of resources from a legacy mode of operation to a new mode of operation. These signals are received at another entity of a wireless access network, e.g., a subscriber station, which then controls use by the subscriber station of resources allocated to the subscriber station in accordance with the information.

32 Claims, 6 Drawing Sheets

METHOD AND APPARATUS FOR PRESERVING COMPATIBILITY BETWEEN LEGACY MODE(S) OF OPERATION AND NEW MODE(S) OF OPERATION IN A COMMUNICATION SYSTEM

BACKGROUND

1. Field

The invention relates to a method and an apparatus for preserving compatibility between legacy mode of operation and new mode of operation in a communication system, wherein allocation of resources is different in the legacy mode of operation and the new mode of operation.

2. Background

Communication systems have been developed to allow transmission of information signals from an origination station to a physically distinct destination station. In transmitting information signal from the origination station, the information signal is first converted into a form suitable for efficient transmission over a communication channel. Conversion of the information signal involves varying a parameter of a carrier wave (carrier frequency) in accordance with the information signal in such a way that the spectrum of the resulting modulated carrier wave is confined within a pre-determined bandwidth. At the destination station, the original information signal is reconstructed from the carrier wave received over the communication channel. In general, such a reconstruction is achieved by using an inverse of the modulation process employed by the origination station.

Although from a theoretical standpoint entire electromagnetic spectrum is available, only a portion of the electromagnetic spectrum is usable due to existing technical, commercial, and regulatory confines. Consequently, the range of useful and available frequencies is finite, and; therefore, limited. As such, the usable portion of the electromagnetic spectrum represents a limited resource.

Originally, communication systems allowing users to communicate with one another comprised point-to-point systems, in which two users communicated with each other. In order that each user of the point-to-point system could talk to the other user at the same time, each user would be allotted its own communication channel for transmission, which will be used by the other user for reception. The communication channel comprises a portion of the electromagnetic spectrum.

According to one approach, the available electromagnetic spectrum resource is divided into separate, non-overlapping frequency bands each centered over an associated carrier frequency. Each of such separate, non-overlapping frequency bands comprises a communication channel. As illustrated in FIG. 1, a first communication channel comprising frequency band 110 is allocated to one user (not shown). The frequency band is centered about a first carrier frequency 112. A second communication channel, allocated to another user (not shown), comprises a frequency band 114, centered about a second carrier frequency 116. The width of each allocated frequency band 110, 114 (also known as the bandwidth) is dependent on the amount of information to be transmitted in a given period of time; the greater the information rate, the wider the bandwidth. Such an arrangement is known as frequency division multiplexing (FDM).

According to another approach, the available electromagnetic spectrum resource is divided into separate, non-overlapping frequency bands each centered over an associated carrier frequency, and each frequency band is further divided in a plurality of time intervals. A communication channel comprises a time interval or a plurality of time intervals in a frequency band. As illustrated in FIG. 2 (for one frequency band 200) a user (not shown) has use of the resource for communicating information signal for a first time interval 210(1) and another user (not shown) has use of that same frequency band 200 for communicating information signal for a second time interval 210(2). In the case of the above described point-to-point system—use of the resource would then be handed back to the first user for a third time interval 210(3), and so on with the use swapping between the two users as time progresses. It is noted that the time intervals 210(i), i=1 through N, may, but do not need to be of equal length. Such an arrangement is known as time division multiplexing (TDM).

It follows from the foregoing that, in a time division arrangement, the communication channel is discontinuous in time, e.g., a user may transmit only in the time intervals, in which the communication channel is allocated to the user.

In yet another approach to dividing the electromagnetic spectrum resource, the available electromagnetic spectrum resource is divided into separate, non-overlapping frequency bands, each centered over an associated carrier frequency, and in each of the frequency bands different communication channels are distinguished from each other by means of the use of codes. For each user, the code is combined with information signal before modulation on the electromagnetic carrier frequency. The codes are applied in such a manner that the information signal is spread over the whole of the available frequency band of the electromagnetic spectrum resource. Thus, instead of being distinguished by frequency or time, individual communication channels are defined by codes. As illustrated in FIG. 3 (for one frequency band 300), each of the two users (not shown) in a code division multiplex (CDM), is assigned one of codes 310(1), 310(2), 310(n), each of the codes being uniquely distinguishable from all other codes.

As the demand for communication has grown, the limited electromagnetic spectrum could not accommodate the number of communications and communication systems using a point-to-multipoint topology for bidirectional communication have been developed. Such communication systems, in which a plurality of users—multipoint—are communicating concurrently and bidirectionally with or through a common communication point, are exemplified by dispatch systems and mobile telephone communication systems (both terrestrial and satellite based).

To manage a multiple-access in such communication systems, i.e., the capability of a common communication point (a base station), to function as a portion of a communications link between more than a pair of the multiple users on subscriber stations concurrently, each of the above-discussed techniques for electromagnetic spectrum allocation was utilized, resulting in communication systems utilizing Frequency-Division Multiple Access (FDMA), Time-Division Multiple Access (TDMA), and Code-Division Multiple access (CDMA).

The above-referred multiple-access communication systems are complex and different parts of a communication system are supplied by different manufacturers. Consequently, different manufacturers' products must be compatible with one another. Compatibility is achieved by way of agreement between manufacturers, resulting in standards being defined.

With the viability of all the above-referred multiple-access techniques, there are numerous standards that have been adopted in different parts of the world. In Europe, one of the standards adopted for second generation (2G) cellular communication systems is the so-called GSM standard, which is based on a combination of the above discussed FDMA and TDMA techniques. In contrast, in the United States and Korea a CDMA standard known as IS-95 ("TIA/EIA/IS-95 Mobile Station-Base Station Compatibility Standard for Dual-Mode Wide-Band Spread Spectrum Cellular System") was adopted for the 2G cellular communication systems. Other countries, including the United States and Europe, have several different cellular communication systems and have adopted various different standards depending on the choice of the cellular communication system owners.

The development of a standard is a relatively slow process. This is becoming more problematic as the rate of technological advances increases. No sooner are standards set than they become out-dated and new standards have to be defined to take their place. An important consideration in developing a new standard is backward compatibility with existing—legacy—communication systems as well as envisioned evolution, if only because owners and users of the existing communication systems do not expect their equipment to become redundant and unusable in a short period of time.

The requirement for backward compatibility is also hindering evolution of existing standards in what should be a fast-developing environment. When a new standard is being developed, it is necessary at a very early stage of the standardization and regulation process to establish many attributes of a communication system, e.g., frequency band, (multiple) access method, communication channel(s) waveform, and the like. At this time, potential advances of technology during the development of the communication system as well as during the lifetime of the standard may usually not been foreseen.

The evolution of a third generation (3G) standards has already shown that enhancements of certain attributes of existing mode(s) of operation or an introduction of new attributes is of such a extent, that this enhanced—new mode of operation—must sometimes be delayed and/or complicates maintenance of compatibility with the existing—legacy—mode(s) of operation.

Additionally, new resource-sharing techniques are beginning to be developed and adopted. As an example, an OFDM (orthogonal frequency division multiplexing) is a technique, in which digital information is distributed over a large number of carriers that are spaced apart at precise frequencies.

Additionally, beam-forming techniques and multiple-input-multiple-output (MIMO) techniques are used to implement a space division multiplexing (SDM). These new techniques may be used alongside of or in a combination with such other techniques as FDMA, TDMA, and CDMA in order to optimize use of the available resource.

In a way of an example of the above-mentioned evolution, the 3G evolution of the IS-95 standard is known as CDMA2000 ("TR-45.5 Physical Layer Standard for CDMA2000 Spread Spectrum Systems"). Communication systems built to this CDMA2000 standard are backward compatible to the extent that IS-95 user equipment may be used therein. In Europe the GSM networks are being replaced by equipment built to a standard known as W-CDMA, which is a CDMA-based standard ("3rd Generation Partnership Project" or "3GPP", see for example document nos. 3GPP TS 25.211, 3GPP TS 25.212, 3G TS 25.213, and 3GPP TS 25.214). CDMA2000 equipment and 3GPP equipment are not compatible with each other for a wide variety of reasons, including the bandwidth (1.25 MHz for CDMA2000 vs. 5 MHz for W-CDMA), frequencies and codes used by each station. As mentioned, such an incompatibility is undesirable.

SUMMARY

In one aspect of the invention, a subscriber station is disclosed. The subscriber station comprises a receiver which receives signals comprising information about reallocation of resources from a legacy mode of operation to a new mode of operation and for providing the information about reallocation of resources. The subscriber station further comprises a controller which receives the information about reallocation of resources and controls use by the subscriber station of resources allocated to the subscriber station in accordance with the information about reallocation of resources.

In another aspect of the invention, a method for preserving compatibility between legacy mode(s) of operation and new mode(s) of operation is disclosed. The method comprises receiving at a subscriber station signals comprising information about reallocation of resources from a legacy mode of operation to a new mode of operation and controlling use by the subscriber station of resources allocated to the subscriber station in accordance with the information.

In another aspect of the invention, a communication sub-system is disclosed. The communication sub-system comprises at least one base station for transmitting signals comprising information about reallocation of resources from a legacy mode of operation to a new mode of operation.

In another aspect of the invention, a method for preserving compatibility between legacy mode of operation and new mode of operation in a first network is disclosed. The method comprises reallocating resources from a legacy mode of operation to a new mode of operation and transmitting from a base station signals comprising information about reallocation of resources from a legacy mode of operation to a new mode of operation.

In another aspect of the invention, a communication system is disclosed. The communication system comprises at least one base station for transmitting signals comprising information about reallocation of resources from a legacy mode of operation to a new mode of operation. The communication system further comprises at least one subscriber station for receiving signals comprising the information about reallocation of resources from a legacy mode of operation to a new mode of operation and for controlling use by the subscriber station of resources allocated to the subscriber station in accordance with the information.

In another aspect of the invention, a method for preserving compatibility between legacy mode of operation and new mode of operation in a first network is disclosed. The method comprises reallocating resources from a legacy mode of operation to a new mode of operation. The method further comprises transmitting from a base station signals comprising information about reallocation of resources from a legacy mode of operation to a new mode of operation. The method further comprises receiving at a subscriber station the signals comprising information about reallocation of resources from a legacy mode of operation to a new mode of operation and controlling use by the subscriber station of resources allocated to the subscriber station in accordance with the information.

DETAILED DESCRIPTION

Figure 1:
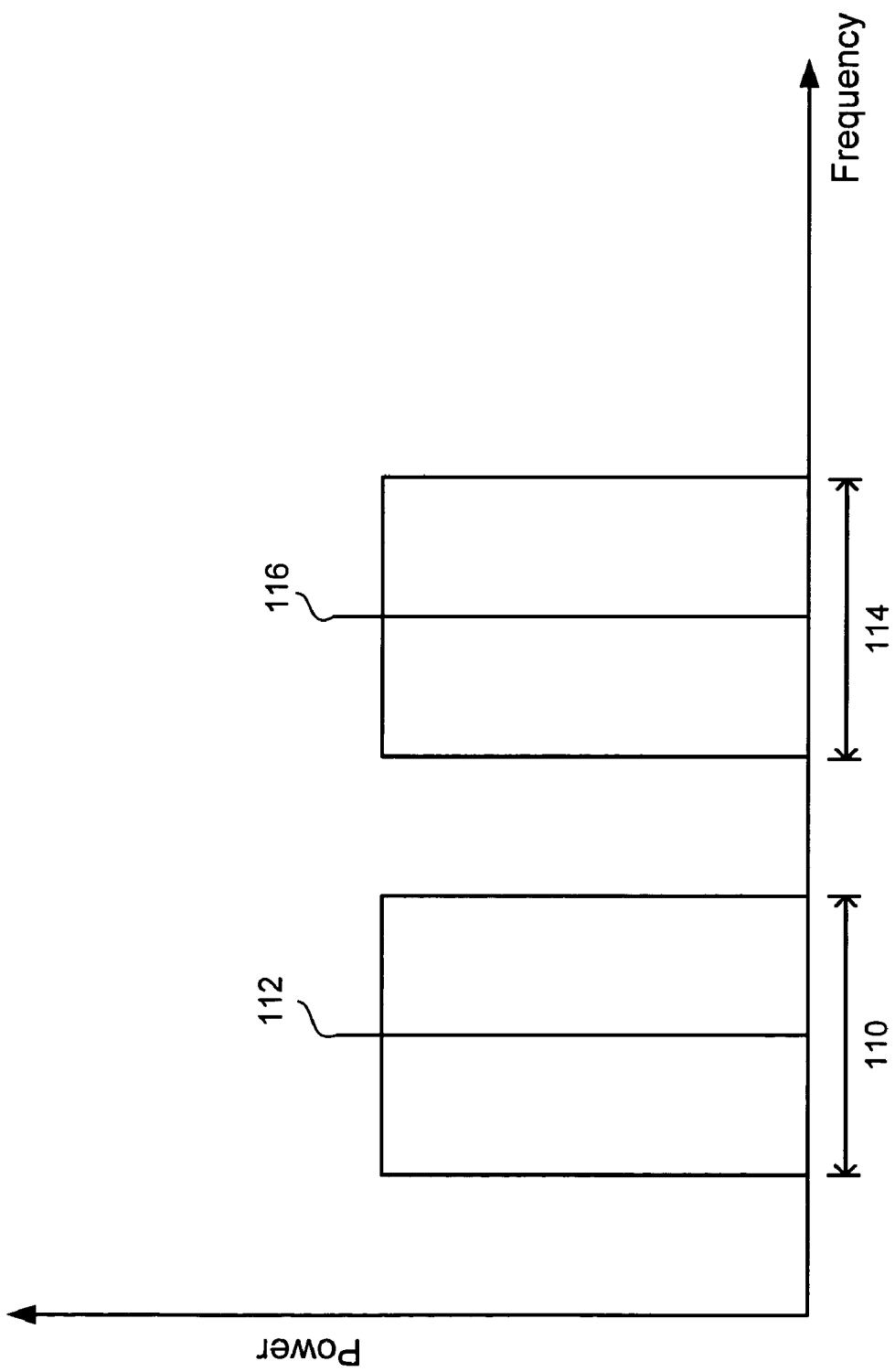
FIG. 1 illustrates frequency division multiplexing (FDM), as already described herein above.
Figure 2:
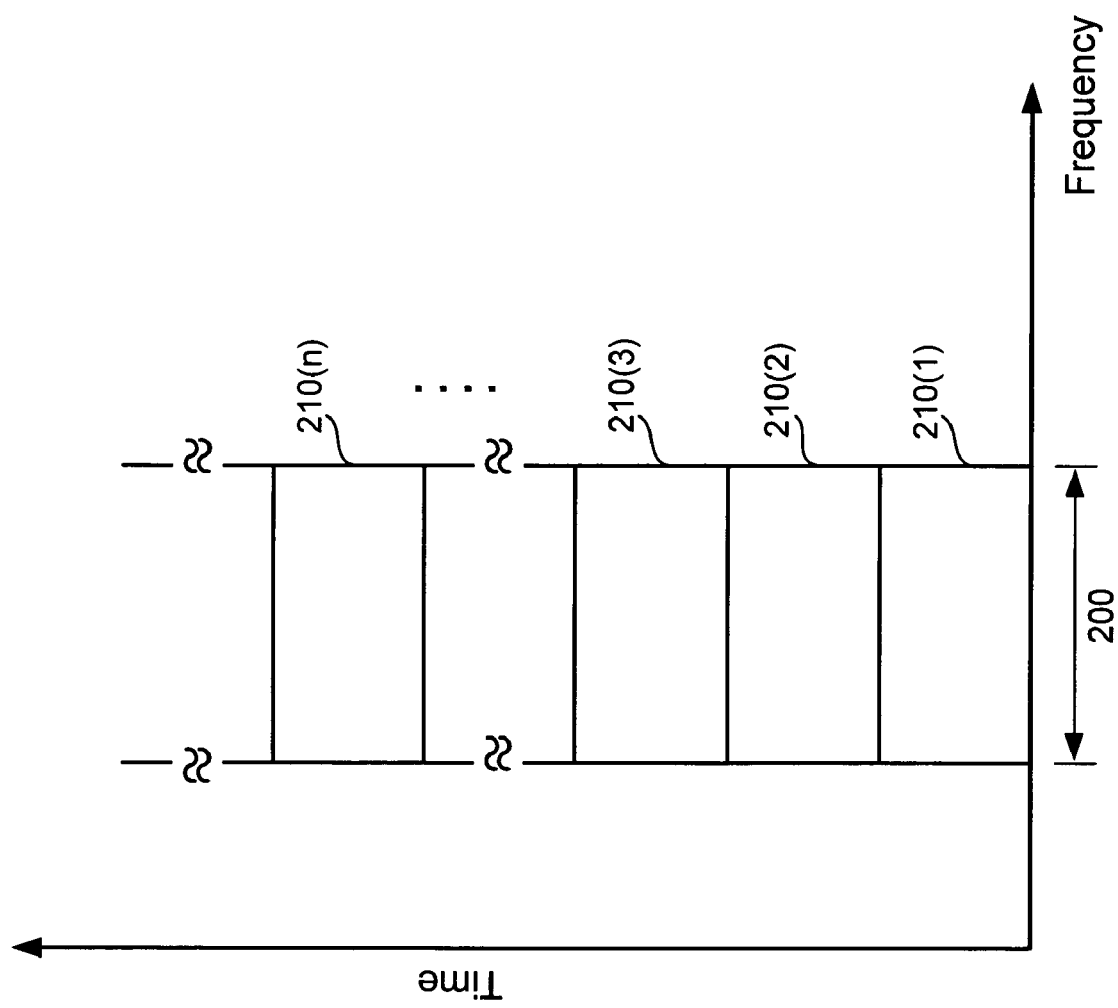
FIG. 2 illustrates time division multiplexing (TDM), as already described herein above.
Figure 3:
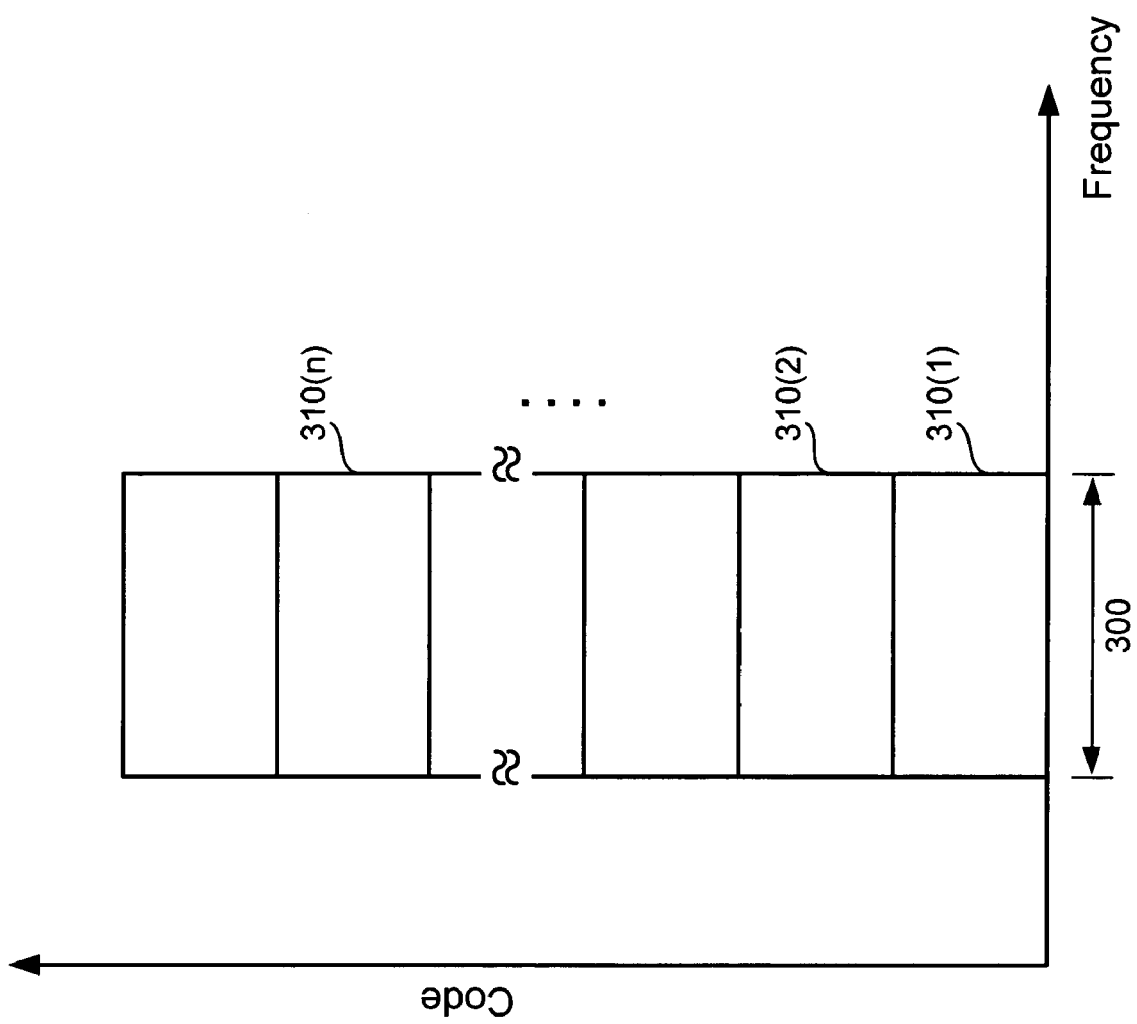
FIG. 3 illustrates a code division multiplexing (CDM), as already described herein above.
Figure 4:
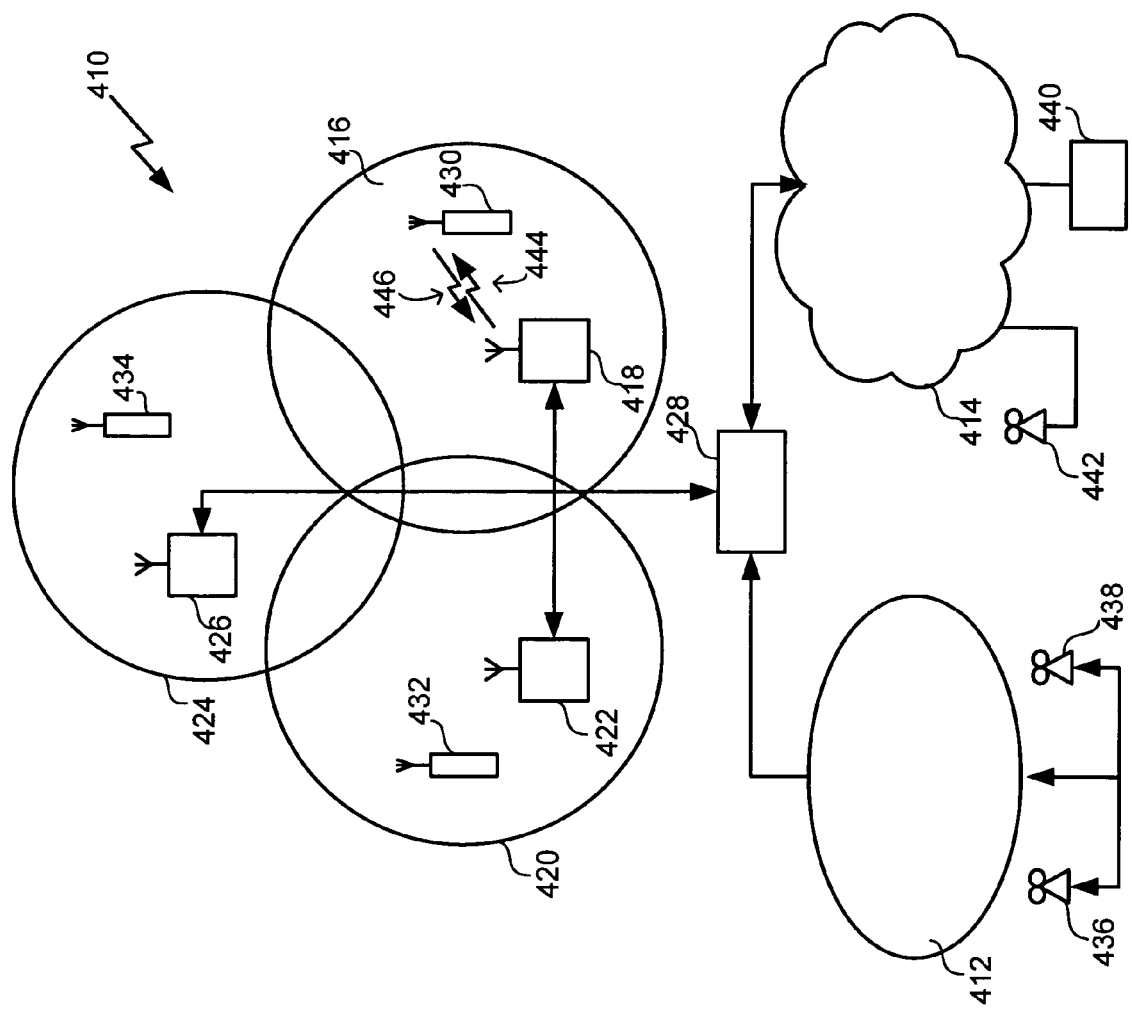
FIG. 4 is a schematic diagram representing a cellular communication system.

Turning now to FIG. 4 of the accompanying drawings, there is shown a cellular communication system 410. In this example, the cellular communication system 410 comprises a wireless access network (represented by base stations 418, 422, and 426 together with a base station controller 428) that is coupled to other communications networks including a public switched telephone network (PSTN) 412 and the Internet 414. It will be appreciated that the cellular communication system 410 will, in reality, be part of a much larger network than shown, and may comprise additional wireless networks, satellite communication systems, and elements, e.g., a gateway between the Internet 414 and base stations 418, 422, and 426, and the like. These additional elements often share common land space with the cellular communication system 410 and make use of separate or overlapping portions of the available electromagnetic spectrum resource. The additional elements have been omitted from the drawing for the sake of clarity.

The wireless access network of the cellular communication system 410 comprises a number of cells 416, 420, and 424, each covering a geographical area. Each cell 416, 420, and 424 is serviced by the respective base station 418, 422, and 426 (also known as Node B in the above-mentioned 3GPP standard). The power at which each base station 418, 422, and 426 transmits signals is selected so that the geographical area of each cell 416, 420, and 424, in which signals can be received, overlaps with the geographical areas of the one or more adjacent cells. In this way, all of the cells in the wireless cellular communication system 410 cover a service area.

The base stations 418, 422, and 426 are controlled by one or more base station controllers 428 (also known as radio network controllers in the above-mentioned 3GPP standard), of which only one is shown. The radio network controller 428 is coupled to other elements in the larger communication network, including the PSTN 412 and the Internet 414.

For the sake of clarity, the terms base station and base station controller will be used to identify entities with functions analogous to base station and base station controller in any applicable wireless access network.

The cellular communication system 410 is provided to enable subscriber stations 430, 432, and 434 within the service area of the wireless access network to communicate with other subscriber stations on the same wireless access network, subscriber stations on other cellular communication systems (not shown), subscriber stations 436 and 438 on the PSTN 412 and subscriber stations 440 and 442 on the Internet 414.

The subscriber stations 430, 432, and 434 are entities that communicate through the wireless access network of the cellular communication system 410 with other subscriber stations as described above. A subscriber station may be mobile or stationary; may enable user related services such as voice services, data services or a combination of the two. Voice services enabling subscriber stations include, but are not limited to, mobile and stationary phones; data services enabling subscriber stations include, but are not limited to, PC cards, compact flash devices, and data modems.

Communication between base stations and a subscriber stations, e.g., a base station 418 and a subscriber station 430, is effected by the allocation of resources. A downlink 444 from the base station 418 to the subscriber station 430 is established by allocating some of the available resources; and an uplink 446 from the subscriber station 430 to the base station 418 is established by allocating some of the available resources.

In many communication systems, the allotted electromagnetic spectrum resource has been divided for use in downlink communications and uplink communications in accordance to a frequency division duplexing (FDD) approach. The individual downlink and uplink between a base station and a subscriber station was then established by dynamically allocating resources in accordance with each individual link resources requirements as described below.

Figure 5:
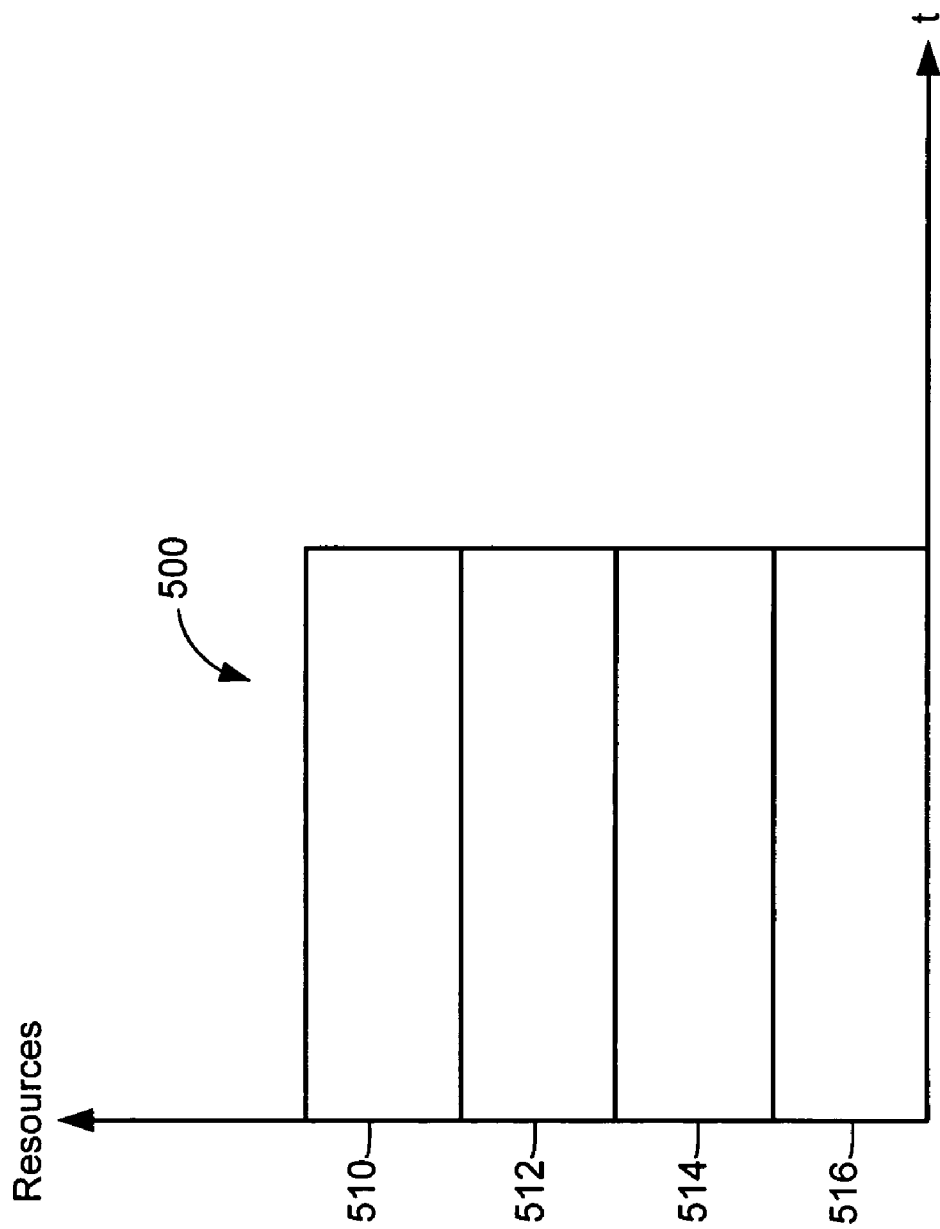
FIG. 5 is a schematic diagram showing how resources are allocated in a downlink in the cellular communication system of FIG. 4.

The allocation of resources 500 to a link, e.g. a downlink, is illustrated in FIG. 5 of the accompanying drawings. Depending on the over the air interface standard adopted in the wireless access network of the cellular communication system 410 (of FIG. 4), the resources may include, but not being limited to frequency, time, power, space, polarization, code, interleaving, modulation, and the like.

Some of the resources 510, 512, 514, and 516 are used to transfer control information from a base station (which in turn may have received the control information from the base station controller) to a subscriber station. Depending on the specific design of the wireless network, some resources will be used by the base station to broadcast control information to all subscriber stations in the base station's cell, while other resources are used to transfer control information solely to one of the subscriber stations. Yet other resources are used to transfer user information (e.g., voice or data) to the subscriber station for the user.

In a similar manner, the uplink comprises resources (not shown), including, but not being limited to frequency, time, power, space, polarization, code, interleaving, modulation, and the like. The function of the uplink is similar to that of downlink, i.e., some of the resources are used to transfer control information to the base station, other uplink resources are used to transfer user information (e.g. voice or data) from the subscriber station to the base station for onward transfer to its ultimate destination elsewhere in the cellular communication system 410.

At any given time there may be numerous subscriber stations 430, 432, and 434 communicating with the base stations 418, 422, and 426 with the resources being dynamically allocated and reallocated to the uplinks and downlinks as the need to communicate control, broadcast and user information between the subscriber stations 430, 432, and 434 and the base stations 418, 422, and 426.

Although third generation systems allow for the dynamic reallocation of resources, the purpose of the reallocation of resources and the response of the subscriber stations to this reallocation of resources are defined at the same time, so that the capabilities of the subscriber station can be defined in way that allows the planned response. Therefore, the purpose of and response to the reallocation of resources is being already known to the subscriber station and is, therefore, a part of a legacy mode. In other words, the reallocation of resources is a part of a standard, to which the subscriber stations are built.

In a way of an example, in a communication system in accordance with the W-CDMA standard, subscriber stations with a single receiver are not capable of a measurement of signals on frequencies other than the assigned frequency without leaving the assigned frequency channel and interrupting reception on that channel, thus losing data. In order to enable subscriber stations to perform the measurement without loss of data, the communication system supports so-called compressed mode. In the compressed mode, well-defined time-gaps are created in transmission from the wireless access network entity and the data that needs to be transmitted are compressed into the remaining time. When the compressed mode is activated, the wireless access network informs the subscriber station beforehand when the gaps will occur and then commands the subscriber station to use these scheduled gaps for the specific purpose. So in a sense a resource—in this instance time—is reallocated. This reallocation can be also viewed as a restriction on a use of the resource. However, the restricted resource is still used for support of and operation defined in detail in the W-CDMA standard.

In contrast to the above-described reallocation of resources, when a new standard, using resources in a manner different from the manner used by the legacy standard is introduced, the backwards compatibility problems at the subscriber station may arise. This is because the capabilities of the subscriber station were defined to allow planned response only to the reallocation of resources in accordance with the legacy standard, but not to the reallocation of resources from the legacy standard to the new standard.

The reallocation of resources from a legacy standard to a new standard may take many forms, including, but not being limited to, reallocating a single resource or a plurality of resources; using a plurality of resources in one combination in the legacy standard, but in a different combination in the new standard; and the like.

In a way of an example, a legacy subscriber station operating in a legacy mode of operation, defined by e.g., the W-CDMA standard, is designed to receive a code-divided signal in a given time interval. This legacy subscriber station will not be able to respond properly if the same time interval is reallocated for an operating in a new mode of operation, defined by e.g., OFDMA (Orthogonal Frequency Division Multiple Access) standard, which divides the (whole or part of) the resource along the frequency domain resource, providing for a channel comprising a plurality of mutually separate frequencies. At best the subscriber station may simply ignore the signal as meaningless on the basis that the resource is not supported by the legacy station. However, it is also possible that the new use of the resource will interfere in some way with the operation of the legacy station; at worst the signal could be misinterpreted by the subscriber station causing the subscriber station to malfunction. Plainly, this is undesirable.

The reallocation of resource problem is impossible or at least difficult to solve under the current state of the art because there exists no mechanism implemented in legacy subscriber stations allowing the legacy subscriber stations to respond to the reallocation of resources from a legacy mode of operation to a new mode of operation. One solution which overcomes—or at least minimizes—this problem, is to introduce a mechanism for accommodating the legacy subscriber stations to the unknown changes in reallocation of resources that may prove desirable in the future.

To this end, when resources are reallocated in a manner not compatible with the legacy subscriber stations, the wireless access network side of the communication system is arranged to inform the legacy subscriber stations of the communication system about the reallocation of a resource between the legacy and the new mode of operation. Such an arrangement may comprise a base station to be arranged to transmit signals comprising information about reallocation of resources from a legacy mode of operation to a new mode of operation.

The legacy stations cannot know the meaning and consequence of the reallocation of resources because the resource is being used in a manner that the legacy stations are not configured to process. However, the information contained in the signal received by the legacy subscriber stations may be interpreted as a command for controlling the resources allocated to the legacy subscriber stations.

The information may be issued by any entity of the wireless access network, e.g., the base station controller, the base station, and the like. Should the signals comprise information that resources are reallocated from a legacy mode of operation to a new mode of operation, the legacy subscriber stations may ascertain whether a reallocation of resources prevents them from performing a resource related operation or not. The performed operation may be related to the reallocated resource or, the performed operation may be related to a resource affected by the reallocated resource.

In a way of example, a new MIMO operation mode is introduced in a communication system originally operating in only a UMTS (Universal Mobile Telephone System) FDD operation mode. The MIMO operation mode requires signal strengths on common pilot channels different from the signal strengths on common pilot channels used in the UMTS FDD mode of operation. Consequently, the signal strength measurements that are made by the legacy subscriber station utilizing the UMTS FDD mode of operation on the common pilot channels in the MIMO mode of operation are not guaranteed to be possible or yield a correct result. Because the reallocation of resources only affects the carrying out of common pilot strength measurements, the legacy subscriber station may decide to refrain from a resource related operation of common pilot signal strength measurement. However, because the user data transmission for legacy subscriber stations does not need to be interrupted; the legacy subscriber station may decide to perform a resource related operation of a reception of user data transmission.

When the legacy subscriber station decides to perform a resource related operation within the reallocated resource i.e., a resource related operation on or affected by the reallocated resource, the legacy subscriber station may further evaluate result of said performed resource related operation, and, optionally, adjust the result in accordance with said evaluation.

In a way of example, channel estimation results may be generated as weighted average of measurements results performed in successive time intervals. In one weighting mode, the latest time interval is assigned the highest weighting factor, with decreasing weighting, towards older time intervals measurements. When a legacy subscriber station is informed that due to a reallocation of resources, e.g., due to MIMO transmissions in these time intervals, certain time intervals might be affected, thus yield less reliable measurements results, the legacy subscriber station may reduce the weighting factor for these time intervals in the calculation of the channel estimation information.

Alternatively, the entity may determine that the legacy subscriber stations are to refrain from any resource related operation; consequently, the signal transmitted by the base station may comprise information prohibiting the legacy subscriber station from any resource related operation.

In a way of example, a new OFDMA operation mode is introduced in a communication system originally operating in only a CDMA operation mode. To enable the two operating modes to co-exist, the use of the resources could be reallocated so that time intervals would be defined, during which the legacy CDMA operation mode is not used, and, in which the resource is allocated to OFDMA. Because the reallocation of resources is mutually exclusive, any operation of the legacy subscriber stations in the OFDMA operation mode is impossible. Thus, the network would issue the above-discussed message.

Depending on the nature of the new use, to which the resources are to be put, the signal could be transmitted from the base station as a broadcast signal that is applicable to a plurality of the legacy subscriber station, in which case the signal could be transmitted in a broadcast channel. Alternatively, the signal could be a specific signal addressed to a single legacy subscriber station that is active in the network, in which case the signal could be transmitted in a channel currently dedicated to that single subscriber station.

In general the information is transmitted from a base station belonging to the wireless access network, to which the legacy subscriber stations to be provided the information belong. However, it is envisioned that the information may be transmitted from a different wireless access network.

In a way of an example, a subscriber station capable of receiving information on two separate networks, e.g. WLAN (Wide Local Area Network) and W-CDMA, could receive information about the reassignment of resources in the W-CDMA network via a message received on the WLAN network.

Figure 6:
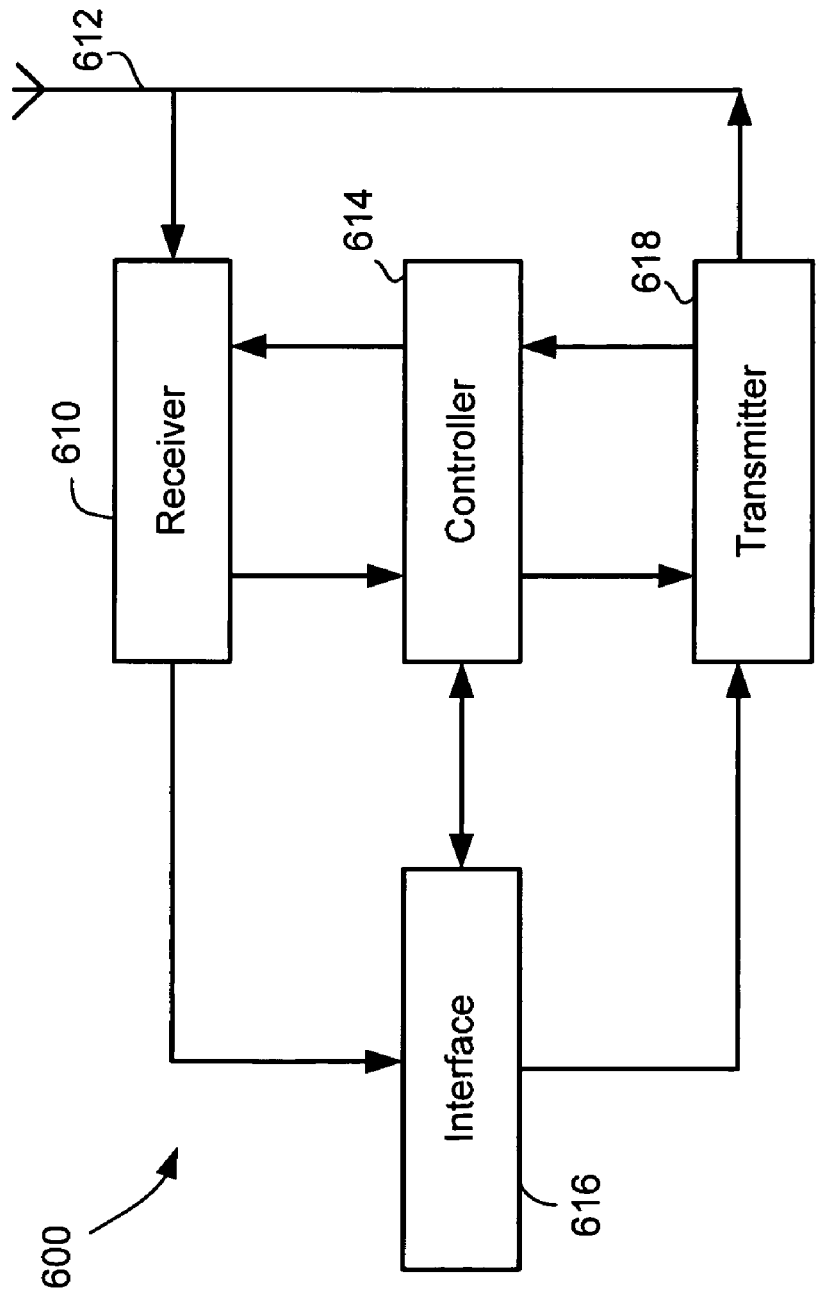
FIG. 6 is a schematic diagram of relevant parts of a subscriber station.

As discussed, the legacy subscriber station will receive signals comprising information about reallocation of resources from a legacy mode of operation to a new mode of operation, and control use by the subscriber station of resources allocated to the subscriber station accordingly. FIG. 6 illustrates a schematic diagram of relevant parts of such a subscriber station 600. The subscriber station comprises a receiver 610, which receives and decodes radio signals from an antenna 612. Decoded signals from the receiver 610 are provided to a controller 614 and/or to an interface 616, depending on whether they represent control information for use in controlling operation of the subscriber station or they represent user data. The subscriber station 600 also comprises a transmitter 618, which is coupled to the controller 614 and the interface 616 for transmission of user data and control information via the antenna 612.

The interface 616 passes the user data on to other units (not shown) that process the data in an appropriate manner. For example, if the user data represented a voice signal, the interface would pass the user data on to an audio decoder for conversion into an audible signal. If the user data represented data information, the interface would condition the data information into a form suitable for a computer, a storage device, or other data manipulation or storage device.

The controller 614 is responsive to received control data to control operation of the receiver 610 and the transmitter 618. The controller 614 controls the transmitter and receiver to use resources allocated to the subscriber station in accordance with the information. As discussed above, such a control may comprise, refraining from any resource related operation within the restricted resource; determining whether resource related operation can be performed; refraining from any resource related operation within the restricted resource when said determining is negative; performing a resource related operation within the restricted resource when said determining is positive; evaluating a result of a performed resource related operation; and adjusting result of said performed resource related operation in accordance with said evaluation.

Having thus described the invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

What is claimed is:

1. A subscriber station comprising:
   a controller:
   for receiving first information about resources allocated to the subscriber station, the allocated resources being a portion of available resources,
   for communicating with a base station using the resources allocated to the subscriber station,
   for receiving second information about reallocation of resources from a legacy mode of operation to a new mode of operation, the reallocated resources comprising at least part of the resources allocated to the subscriber station, and
   for controlling use by the subscriber station of the resources allocated to the subscriber station in accordance with the second information about reallocation of resources.

2. The subscriber station as claimed in claim 1, wherein said controller determines whether a resource related operation can be performed based on the second information and controls use by the subscriber station of the resources allocated to the subscriber station in accordance with a result of said determining whether a resource related operation can be performed.

3. The subscriber station as claimed in claim 2, wherein said controller controls use by the subscriber station of the resources allocated to the subscriber station by refraining from any resource related operation within the reallocated resources when said determining is negative.

4. The subscriber station as claimed in claim 2, wherein said controller controls use by the subscriber station of the resources allocated to the subscriber station by performing a resource related operation within the reallocated resources when said determining is positive.

5. The subscriber station as claimed in claim 4, wherein said controller controls use by the subscriber station of the resources allocated to the subscriber station in accordance with evaluating a result of said performed resource related operation.

6. The subscriber station as claimed in claim 5, wherein said controller controls use by the subscriber station of the resources allocated to the subscriber station by adjusting result of said performed resource related operation in accordance with said evaluation.

7. The subscriber station as claimed in claim 1, said second information comprising prohibition of a resource related operation; and
   wherein said controller controls use by the subscriber station of the resources allocated to the subscriber station by refraining from any resource related operation within restricted resources.

8. A method for preserving compatibility between legacy mode(s) of operation and new mode(s) of operation, the method comprising:
   receiving first information about resources allocated to a subscriber station, the allocated resources being a portion of available resources;
   communicating with a base station using the resources allocated to the subscriber station;
   receiving second information about reallocation of resources from a legacy mode of operation to a new mode of operation, the reallocated resources comprising at least part of the resources allocated to the subscriber station; and controlling use by the subscriber station of the resources allocated to the subscriber station in accordance with the second information.

9. The method as claimed in claim 8, wherein said controlling use by the subscriber station of the resources allocated to the subscriber station comprises:
determining whether a resource related operation can be performed based on the second information, and
controlling use by the subscriber station of the resources allocated to the subscriber station in accordance with a result of said determining whether a resource related operation can be performed.

10. The method as claimed in claim 9, further comprising:
controlling use by the subscriber station of the resources allocated to the subscriber station by refraining from any resource related operation within the reallocated resources when said determining is negative.

11. The method as claimed in claim 9, further comprising:
controlling use by the subscriber station of the resources allocated to the subscriber station by performing a resource related operation within the reallocated resources when said determining is positive.

12. The method as claimed in claim 11, wherein said controlling use by the subscriber station of the resources allocated to the subscriber station further comprises:
evaluating result of said performed resource related operation.

13. The method as claimed in claim 12, wherein said controlling use by the subscriber station of the resources allocated to the subscriber station further comprises:
adjusting result of said performed resource related operation in accordance with said evaluating.

14. The method as claimed in claim 8, wherein the second information comprises prohibition of a resource related operation; and
wherein said controlling use by the subscriber station of the resources allocated to the subscriber station comprises refraining from any resource related operation within the reallocated resources.

15. A communication sub-system comprising:
at least one base station
for transmitting signals comprising information about allocation of resources to subscriber stations, the allocated resources being a portion of available resources,
for communicating with the subscriber stations using the resources allocated to the subscriber stations, and
for transmitting signals comprising information about reallocation of resources from a legacy mode of operation to a new mode of operation, the reallocated resources comprising at least part of the resources allocated to the subscriber stations.

16. A communication sub-system as claimed in claim 15 wherein said at least one base station:
transmits signals comprising information about reallocation of resources from a legacy mode of operation to a new mode of operation, said information comprising prohibition on a resource related operation.

17. A communication sub-system as claimed in claim 15, wherein said at least one base station:
transmits signals comprising information about reallocation of resources from a legacy mode of operation to a new mode of operation over a broadcast channel.

18. A communication sub-system as claimed in claim 15, wherein said at least one base station:
transmits signals comprising information about reallocation of resources from a legacy mode of operation to a new mode of operation over a dedicated channel.

19. A communication sub-system as claimed in claim 15, further comprising:
a base station controller communicatively coupled to said at least one base station, said base station controller for providing said information about reallocation of resources from a legacy mode of operation to a new mode of operation to said at least one base station.

20. A method for preserving compatibility between legacy mode of operation and new mode of operation in a first network, the method comprising:
allocating resources to subscriber stations, the allocated resources being a portion of available resources;
communicating with the subscriber stations using the resources allocated to the subscriber stations;
reallocating resources from a legacy mode of operation to a new mode of operation, the reallocated resources comprising at least part of the resources allocated to the subscriber stations; and
transmitting from a base station signals comprising information about reallocation of resources from a legacy mode of operation to a new mode of operation.

21. The method as claimed in claim 20, wherein the information about reallocation of resources from a legacy mode of operation to a new mode of operation comprises:
prohibition of any resource related operation.

22. The method as claimed in claim 20, wherein said transmitting from a base station signals comprising information about reallocation of resources from a legacy mode of operation to a new mode of operation comprises:
transmitting from a base station signals comprising information about reallocation of resources from a legacy mode of operation to a new mode of operation message on a dedicated channel.

23. The method as claimed in claim 20, wherein said transmitting from a base station signals comprising information about reallocation of resources from a legacy mode of operation to a new mode of operation comprises:
transmitting from a base station signals comprising information about reallocation of resources from a legacy mode of operation to a new mode of operation message on a broadcast channel.

24. The method as claimed in claim 20, wherein said transmitting from a base station signals comprising information about reallocation of resources from a legacy mode of operation to a new mode of operation comprises:
transmitting from a base station in said first network signals comprising and information about reallocation of resources from a legacy mode of operation to a new mode of operation.

25. The method as claimed in claim 20, wherein said transmitting from a base station signals comprising information about reallocation of resources from a legacy mode of operation to a new mode of operation comprises:
transmitting from a base station in a second network to said first network signals comprising information about reallocation of resources from a legacy mode of operation to a new mode of operation.

26. A communication system comprising:
a base station:
for transmitting signals comprising first information about allocation of resources, the allocated resources being a portion of available resources; and
for transmitting signals comprising second information about reallocation of resources from a legacy mode of operation to a new mode of operation; and a subscriber station:
for receiving the signals comprising the first information about allocation of resources;
for communicating with the base station using the allocated resources;
for receiving the signals comprising the second information about reallocation of resources from a legacy mode of operation to a new mode of operation, the reallocated resources comprising at least part of the allocated resources; and
for controlling use by the subscriber station of the resources allocated to the subscriber station in accordance with the second information.

27. A method for preserving compatibility between legacy mode of operation and new mode of operation in a first network, the method comprising:
allocating resources to a subscriber station, the allocated resources being a portion of available resources;
reallocating resources from a legacy mode of operation to a new mode of operation, the reallocated resources comprising at least part of the resources allocated to the subscriber station;
transmitting from a base station signals comprising first information about allocation of resources to the subscriber station;
communicating with the subscriber station using the resources allocated to the subscriber station;
transmitting from the base station signals comprising second information about reallocation of resources from a legacy mode of operation to a new mode of operation;
receiving at the subscriber station the signals comprising the first information about allocation of resources to the subscriber station;
receiving at the subscriber station the signals comprising the second information about reallocation of resources from a legacy mode of operation to a new mode of operation; and
controlling use by the subscriber station of the resources allocated to the subscriber station in accordance with the second information.

28. An apparatus comprising:
means for receiving first information about resources allocated to a subscriber station; the allocated resources being a portion of available resources;
means for communicating with a base station using the resources allocated to the subscriber station;
means for receiving second information about reallocation of resources from a legacy mode of operation to a new mode of operation, the reallocated resources comprising at least part of the resources allocated to the subscriber station; and
means for controlling use by the subscriber station of the resources allocated to the subscriber station in accordance with the second information.

29. The apparatus as claimed in claim 28, wherein said means for controlling use by the subscriber station of the resources allocated to the subscriber station comprises:
means for determining whether a resource related operation can be performed based on the second information, and
means for controlling use by the subscriber station of the resources allocated to the subscriber station in accordance with a result of said determining whether a resource related operation can be performed.

30. The apparatus as claimed in claim 29, further comprising:
means for controlling use by the subscriber station of the resources allocated to the subscriber station by refraining from any resource related operation within the reallocated resources when said determining is negative.

31. The apparatus as claimed in claim 29, further comprising:
means for controlling use by the subscriber station of the resources allocated to the subscriber station by performing a resource related operation within the reallocated resources when said determining is positive.

32. A machine-readable medium having stored thereon machine-executable instructions for:
receiving first information about resources allocated to a subscriber station, the allocated resources being a portion of available resources;
communicating with a base station using the resources allocated to the subscriber station;
receiving second information about reallocation of resources from a legacy mode of operation to a new mode of operation, the reallocated resources comprising at least part of the resources allocated to the subscriber station; and
controlling use by the subscriber station of the resources allocated to the subscriber station in accordance with the second information.

* * * * *